United States Patent
Tandon et al.

(10) Patent No.: US 10,402,075 B2
(45) Date of Patent: Sep. 3, 2019

(54) SYSTEMS AND METHODS FOR DATA VISUALIZATION

(71) Applicant: PAYPAL, INC., San Jose, CA (US)

(72) Inventors: Abhas Tandon, Lucknow (IN); Ramakrishnan Kadayam Subramanian, Chennai (IN)

(73) Assignee: PayPal, Inc., San Jose, CA (US)

( * ) Notice: Subject to any disclaimer, the term of this patent is extended or adjusted under 35 U.S.C. 154(b) by 484 days.

(21) Appl. No.: 15/195,636

(22) Filed: Jun. 28, 2016

(65) Prior Publication Data
US 2017/0371529 A1 Dec. 28, 2017

(51) Int. Cl.
*G06F 3/0484* (2013.01)
*G06F 3/0482* (2013.01)
*G06F 3/0488* (2013.01)

(52) U.S. Cl.
CPC ........ *G06F 3/04847* (2013.01); *G06F 3/0482* (2013.01); *G06F 3/04842* (2013.01); *G06F 3/04883* (2013.01)

(58) Field of Classification Search
CPC ............... G06F 17/30067; G06F 3/04855
See application file for complete search history.

(56) References Cited

U.S. PATENT DOCUMENTS

| | | | |
|---|---|---|---|
| 8,854,549 B2 | 10/2014 | Price et al. | |
| 2003/0063130 A1* | 4/2003 | Barbieri | G11B 27/105 715/833 |
| 2005/0091604 A1* | 4/2005 | Davis | G06F 3/0482 715/772 |
| 2005/0094014 A1 | 5/2005 | Haas et al. | |
| 2007/0073606 A1* | 3/2007 | Lai | G06Q 40/04 705/37 |
| 2010/0223078 A1* | 9/2010 | Willis | G06Q 40/08 705/4 |
| 2010/0333028 A1* | 12/2010 | Welsh | H04L 67/322 715/833 |
| 2011/0157046 A1* | 6/2011 | Lee | G04G 21/08 345/173 |
| 2015/0206245 A1* | 7/2015 | Basu | G06Q 40/06 705/36 R |

OTHER PUBLICATIONS

Roadmunk, Time Period Indicators. 2015, 11 Pages.

* cited by examiner

*Primary Examiner* — Rayeez R Chowdhury
(74) *Attorney, Agent, or Firm* — Haynes and Boone LLP (57) ABSTRACT

Systems and methods for data visualization are disclosed. An example method includes: detecting a first movement of a first User Interface (UI) element on a slider bar; determining that the first UI element is located within an active portion of the slider bar. The active portion comprises at least a sub-portion of the slider bar. The method also includes, determining that a second UI element is located within the active portion of the slider bar; determining a relative position of the first UI element to the second UI element; and assigning transaction priorities to a first entity identified by the first UI element and to a second entity identified by the second UI element based on the relative position. The method optionally includes causing a transaction involving the first entity and the second entity to be executed based on the transaction priorities.

20 Claims, 6 Drawing Sheets

```
┌─────────────────────────────────────────────────────────────────────┐
│ Detect a first movement of a first user interface (UI) element on a │
│ slider bar.                                                          │
│                                                                 402  │
└─────────────────────────────────────────────────────────────────────┘
                                    │
                                    ▼
┌─────────────────────────────────────────────────────────────────────┐
│     Determine that the first UI element is located within an active portion of │
│ the slider bar.                                                      │
│     The active portion comprises at least a sub-portion of the slider bar. │
│                                                                 404  │
└─────────────────────────────────────────────────────────────────────┘
                                    │
                                    ▼
┌─────────────────────────────────────────────────────────────────────┐
│     Determine that a second UI element is located within the active portion │
│ of the slider bar.                                                   │
│                                                                 406  │
└─────────────────────────────────────────────────────────────────────┘
                                    │
                                    ▼
┌─────────────────────────────────────────────────────────────────────┐
│     Determine that a second UI element is located within the active portion │
│ of the slider bar.                                                   │
│                                                                 408  │
└─────────────────────────────────────────────────────────────────────┘
                                    │
                                    ▼
┌─────────────────────────────────────────────────────────────────────┐
│     Assign, based on the relative position, automatically without user input, │
│ transaction priorities to a first entity identified by the first UI element and to a │
│ second entity identified by the second UI element.                  │
│                                                                 410  │
└─────────────────────────────────────────────────────────────────────┘
```

SYSTEMS AND METHODS FOR DATA VISUALIZATION

TECHNICAL FIELD

The present disclosure relates generally to data visualization, and in particular, to data selection and visualization using a slider bar.

BACKGROUND

Selecting items, from a group of items, and assigning priorities to the selected items often require multiple user actions, for example, e.g., double-clicking/clicking on an item to select and assign a number or letter to the selected item to indicate its priority. The problem exacerbates when a user is required to carry out these actions on a device equipped with a limited user input means, e.g., a small touch screen or a tiny keyboard.

There is therefore a need for a device, system, and method, which provide data selection and visualization features that require less user efforts.

BRIEF DESCRIPTION OF THE FIGURES

FIG. 5 is a schematic view illustrating an embodiment of a computing system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for data selection and visualization using a slider bar.

For example, a slider bar can enable a user to select items and assign priorities thereto with reduced user effort, especially where the user input means is limited. A slider bar can include two portions: an active portion and an inactive portion. A user may drag and drop items along the slider bar into and out of an active portion.

Items placed within an active portion represent user-selected items and items located within an inactive portion represent unselected items; the sequence in which the selected items are placed on or into an active portion can represent priorities among these items.

The systems and methods described in the present disclosure can provide a variety of technical advantages.

First, a single user action can achieve several results or actions, reducing the total amount of user effort required. For example, positioning an icon representing a payee relative to that representing another payee on a slider bar can indicate not only that both payees are selected for receiving a payment, but also that one payee should be paid before the other payee.

Second, a slider bar may resize or reshape automatically in accordance with a user device's orientation or a user's holding position of the user device, further reducing user effort required to prioritize user interface (UI) elements displayed on the slider bar.

Additional details of implementations are now described in relation to the Figures.

Figure 1:
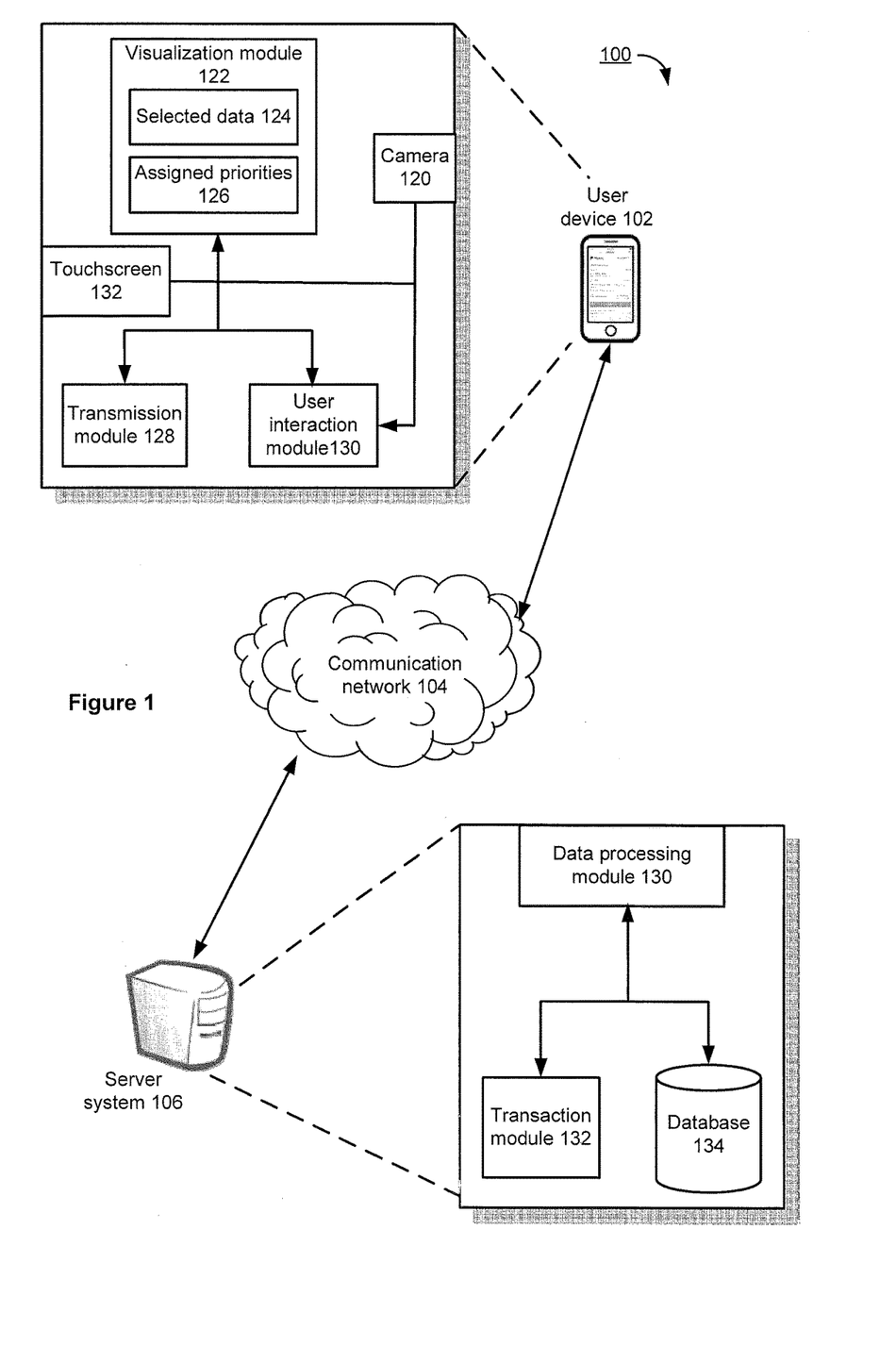
FIG. 1 is a schematic view illustrating an embodiment of a system for data selection and visualization using a slider bar.

FIG. 1 is a schematic view illustrating an embodiment of a system for data selection and visualization using a slider bar. The system 100 may comprise or implement a plurality of servers and/or software components that operate to perform various technologies provided in the present disclosure.

As illustrated in FIG. 1, the system 100 may include a user device 102 and a server system 106 in communication over a communication network 104. In the present disclosure, a user device may be a smartphone, a laptop computer, a notebook computer, a mobile computer, or a desktop computer.

In one embodiment, the user device 102 collects user inputs (e.g., finger gestures on a touch screen and/or finger or body movements in front of a camera) and obtains data from the server system 106 in accordance with the user inputs and presents the data on the user device 102. In some embodiments, the user device 102 may include a camera 120, a visualization module 122, a transmission module 128, a user interaction module 130, and a touchscreen 132.

In some embodiments, the camera 120 captures user movements (e.g., finger or body movements) within its view and provides them as user input to the user interaction module 130. For example, the camera 120 may recognize a user as moving her finger or hand from the left to the right. The camera 120 may also recognize a user as swiping her fingers in an upward direction. The camera 120 may capture user movements when working in a background mode. For example, a data visualization application may be running in the foreground, while the camera 120 may, after being activated, run in the background to capture user movements within its view and provide these user movements as inputs to the user interaction module 130, which in turn provides input to the data visualization application. The touch screen 132 may also provide inputs to the user interaction module 130.

The user interaction module 122 may identify user inputs to the device 102 (e.g., user movements captured by the camera 102 or finger gestures detected on the touch screen 132) and provide these inputs to the visualization module 122 and transmission module 128.

The visualization module 122 may visualize data based on one or more user inputs identified by the user interaction module 130, e.g., presenting or displaying user-selected data using a chart, a table, or any other graphical tools. The transmission module 122 may transmit and receive data from the server system 106 for presentation on the user device 102.

In some implementations, the communication network 104 interconnects one or more user devices 102 with each other, and with the server system 106. In some implementations, the communication network 104 optionally includes the Internet, one or more local area networks (LANs), one or more wide area networks (WANs), other types of networks, or a combination of such networks.

In one embodiment, the server system 106 obtains user inputs provided by the user device 102, retrieves data from the database 134 in accordance therewith, and provides the retrieved data to the user device 102 for visual presentation to a user. The server system 106 may also apply transactions to user-selected data and store the transaction output to the database 134. For example, the server system 106 may receive information identifying two payees and priorities assigned to the payees (e.g., payee A should be paid in full before payee B is paid) and make payments to the payees based on the assigned priorities.

In one embodiment, the server system 106 includes a data processing module 130, a transaction module 132, and a database 134. The data processing module 130 inquires or accesses, in accordance with user inputs provided by the user device 102, the database 134 and provides matching data to the user device 102. The transaction module 132 performs transactions (e.g., making or receiving payments and providing or modifying transaction history) in accordance with user inputs provided by the user device 102. The database 134 stores data relating to one or more transactions, user accounts, and data visualization results.

Figure 2:
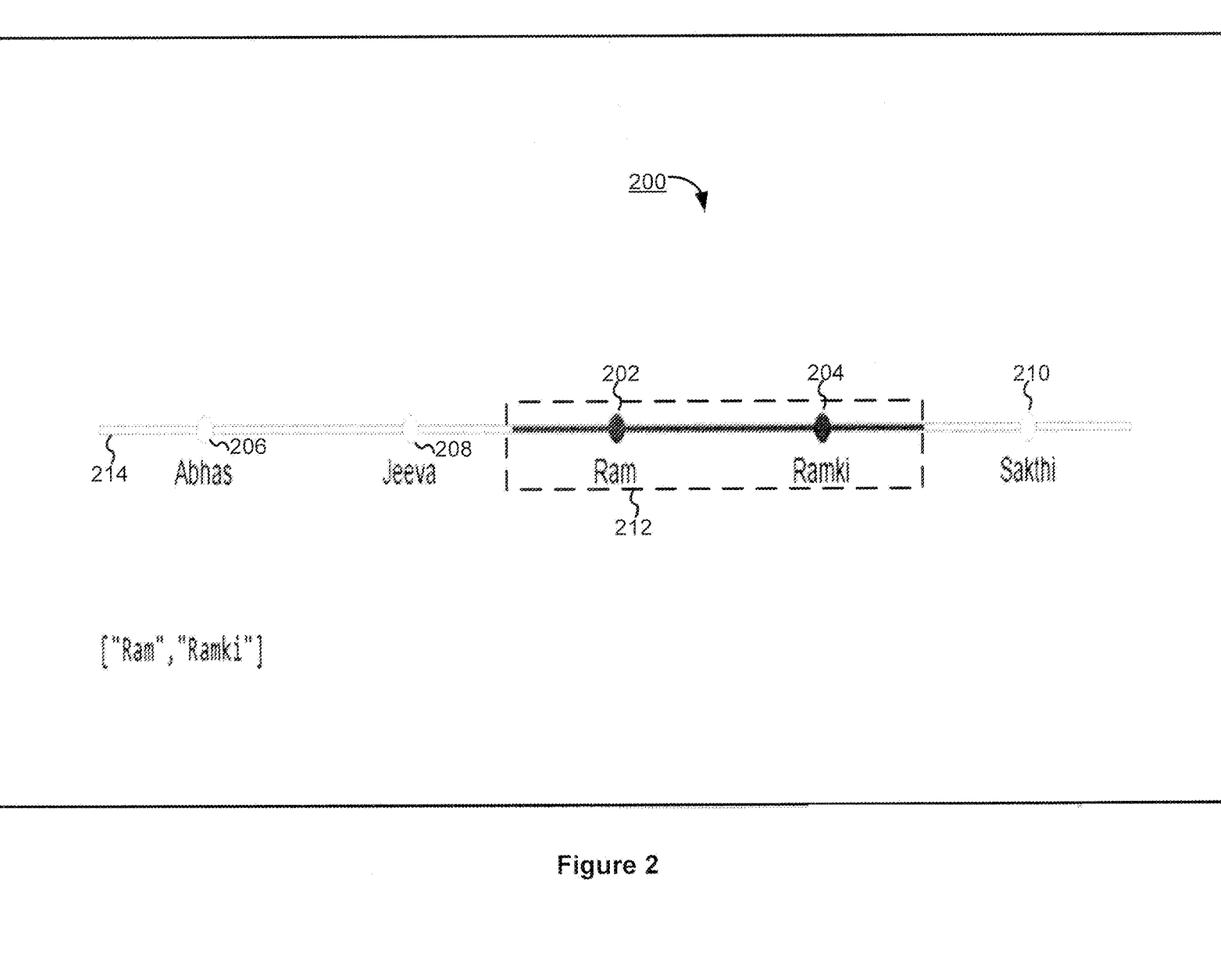
FIG. 2 is a schematic view illustrating an embodiment of a method for data selection and visualization using a slider bar.

FIG. 2 is a schematic view illustrating an embodiment of a method 200 for data selection and visualization using a slider bar. The device 102, for example, when programmed in accordance with the technologies described in the present disclosure, can perform the method 200.

As shown in FIG. 2, five user interface (UI) elements are displayed on the slider bar 214, for example, button-shape slidable elements 202, 204, 206, 208, and 210. A user may change the positions of the elements 202-210 by, for example, sliding or otherwise moving an element from an original or first position/location to a destination or second position/location.

As shown in FIG. 2, the slider bar 214 includes an active portion 212 (the portion surrounded by the broken lines). In some implementations, elements located within the active portion 212 (e.g., the elements 202-204) are considered selected for further processing by a user; elements located outside the active portion 212 (e.g., the elements 206, 208, and 210) are considered not selected by a user. As shown in FIG. 2, the active portion 212 may be displayed in a visual manner different from the manner in which the inactive portion is displayed. For example, the active portion may be displayed in a different color, a different shape, a different graphical pattern, or a combination thereof.

In some implementations, the slider bar 214 includes more than two or more active portions. Active portions may not be continuous to each other. For example, the slider bar 214 may include another active portion that is not immediately adjacent to the portion 212.

For purpose of data processing (e.g., data visualization), a data set is selected for processing when the corresponding UI element is located or moved within an active portion of a slider bar. An example data processing of data sets represented on a slider bar is explained in further detail with reference to FIG. 3.

Figure 3:
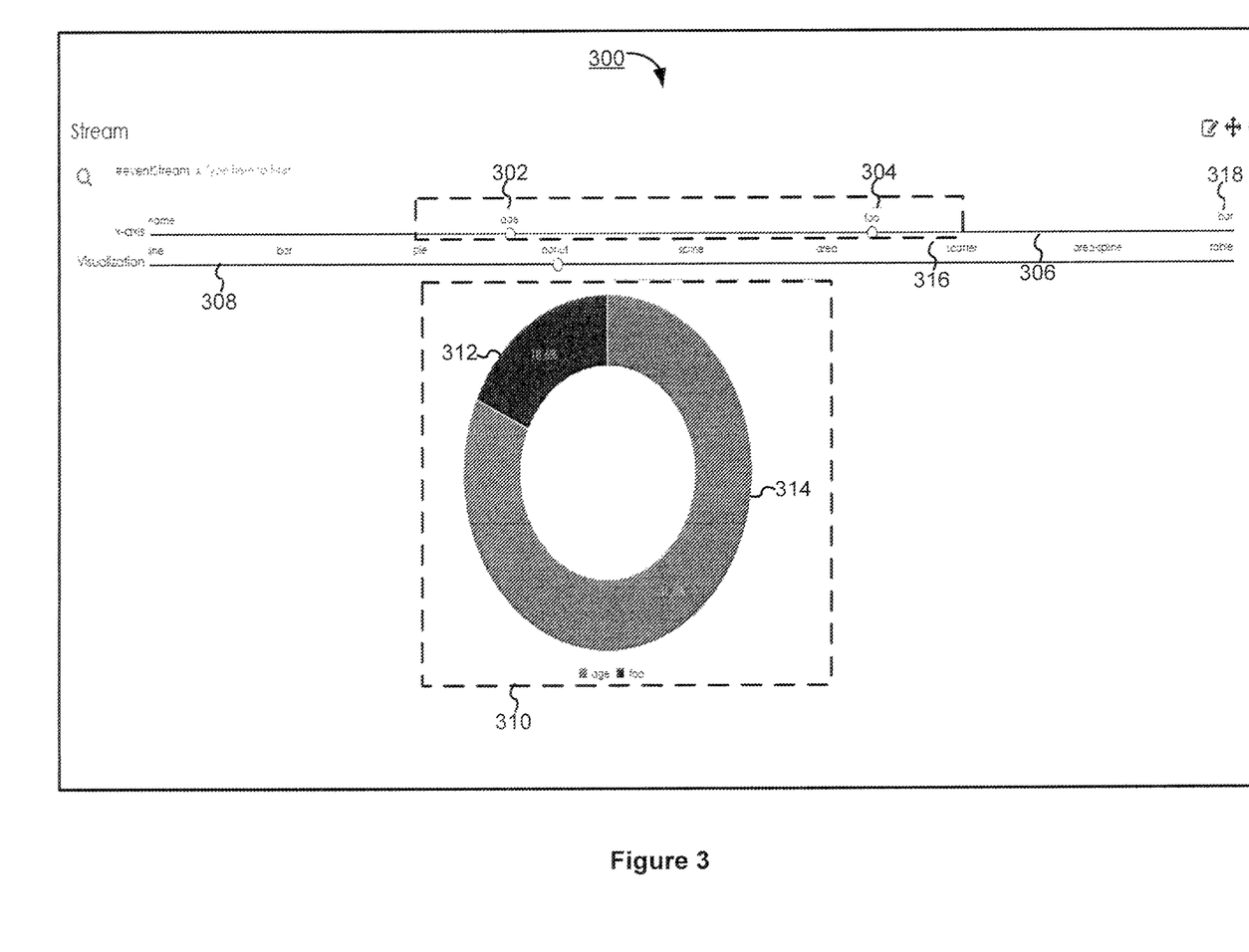
FIG. 3 is a schematic view illustrating an embodiment of a method for data selection and visualization using a slider bar.

FIG. 3 is a schematic view illustrating an embodiment of a method 300 for data selection and visualization using a slider bar. The device 102, for example, when programmed in accordance with the technologies described in the present disclosure, can perform the method 300.

As shown in FIG. 3, several slider bars, e.g., the slider bars 306 and 308, may be provided at the same time. When two or more slider bars are provide, each may serve a different data processing purpose.

For example, the slider bar 306 includes elements representing candidate data sets (e.g., "age," "foo," "name," and "bar") that may be selected for visualization; the slider bar 306 includes elements representing different options of visualizing the selected data sets (e.g., using one or more lines, bars, pie charts, spine chars, areas, scatters, area-spine, or tables).

As indicated by the slider bars 306 and 308, the user-selected data sets are "age" and "foo"; and the selected data visualization method is a "donut" chart, respectively. Accordingly, data sets "age" and "foo" are retrieved from a database and presented using a donut chart 310. Note that different data sets may be displayed in different visual manners.

Using a slider bar to facilitate data representation is technically advantageous for at least the following reasons.

A slider bar may consume less display real estate than do other graphical presentation tools, e.g., a pie chart, a table, a histogram, and a flow chat, leaving more display real estate to the actual data being or to be visualized, which is especially important with devices having smaller displays, such as smartphones.

A slider bar, e.g., a directional one, may enable a user to, though a same user action (e.g., drag and drop) not only select data, but also assign priorities to the selected data. A single data presentation tool can, therefore, achieve two or more data processing goals at the same time.

Further display real estate saving features may be provided. In some implementations, a slider bar may automatically adjust itself based on factors such as a change of user device's orientation or a change of a user's device holding position and, upon resizing, aligns UI elements accordingly. For example, when displayed on a user's desktop computer or other devices where display real estate is more than a predefined size (e.g., 20 square inches), the slider bar 306 may have a greater length or thickness, but, when displayed on a user's smartphone, a connected watch device, or other devices where display real estate is less than a predefined size (e.g., 10 square inches), the slider bar 306 may have a reduced length or thickness.

For another example, a slider bar may be displayed in a vertical manner, if a user is holding her smartphone in an upright position, e.g., to enable a user to provide input using upward or downward finger gesture; and the orientation of the slider bar may change if the user changes her smartphone's orientation.

In another example, the slider bar 306 may be automatically resized based on the number of the UI elements, the size of the UI elements, and/or the number or size of the desired actions for the UI elements.

Figure 4:
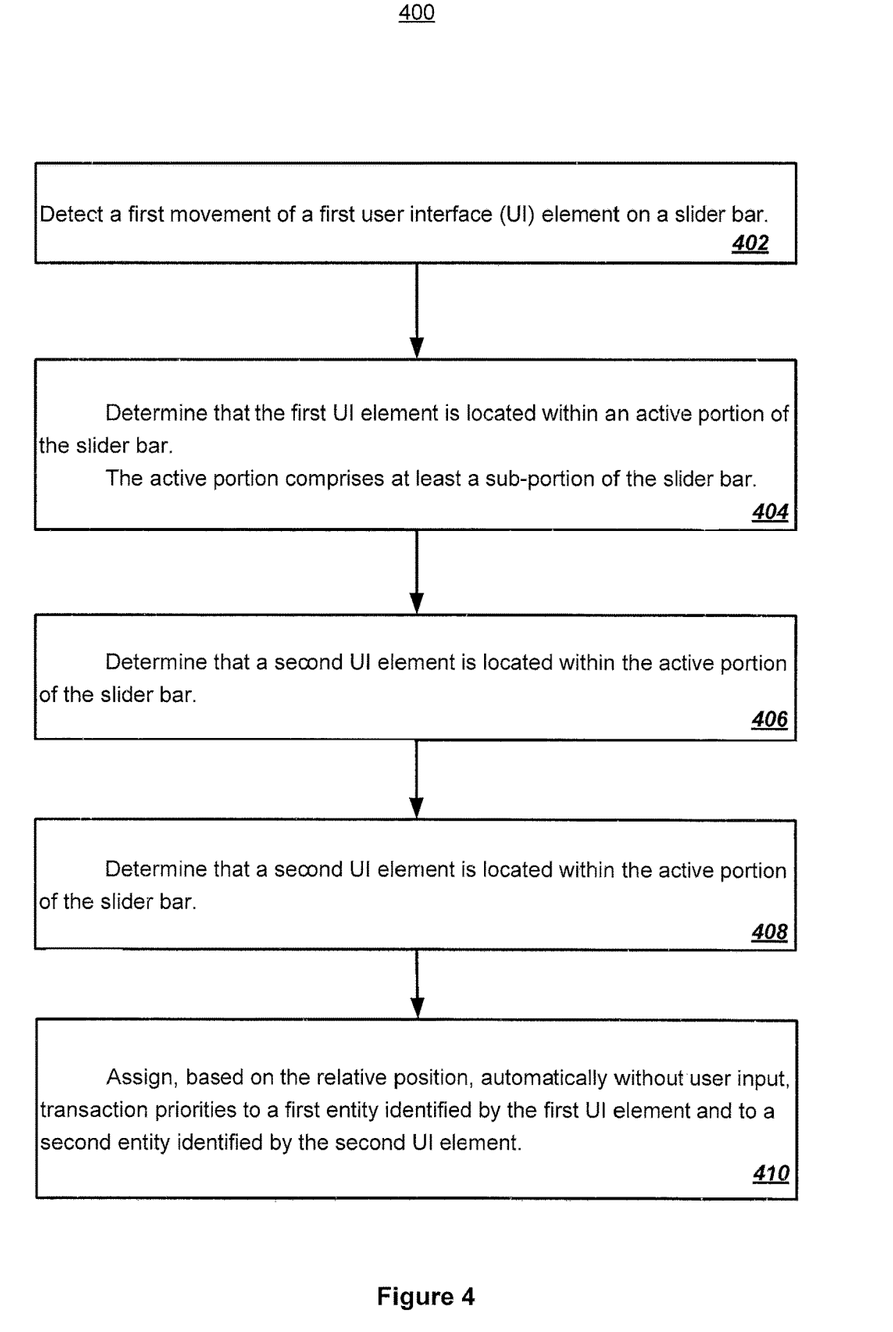
FIG. 4 is a flow chart illustrating an embodiment of a method for data selection and visualization using a slider bar.

FIG. 4 is a flow chart illustrating an embodiment of a method 400 for data selection and visualization using a slider bar. The device 102, for example, when programmed in accordance with the technologies described in the present disclosure, can perform the method 400.

In some embodiments, the method 400 includes detecting (402) a first movement of a first UI element on a slider bar. For example, as explained with reference to FIG. 1, a user may gesture on the touch screen 132 to move a UI element from one location on a slider bar to another location on the slider bar.

In some embodiments, the method 400 includes determining (404) that the first UI element is located within an active portion of the slider bar. A user placing a UI element on an active portion of a slider bar may indicate that the user has selected the entity identified by the UI element; entities identified by the UI elements that are not within a slider bar's active portion may be identified as not selected by the user.

In some embodiments, the active portion is a sub-portion that is less than all of the slider bar. For example, an active portion or the combination of several active portions, in some implementations, is less than the full length (e.g., the entirety) of the slider bar; the portions that are not active are referred to in the present disclosure as inactive portions of the slider bar.

In some alternative embodiments, the active portion includes the entirety of the slider bar. In other words, the entire slider bar is an active portion. In these implementations, UI elements placed or located on the slider bar are considered selected for data visualization purpose; in contrast, UI element not present (e.g., placed or located) on the slider bar are excluded for data visualization purposes.

In some embodiments, the method 400 includes determining (406) that a second UI element is located within the active portion of the slider bar. For example, as shown in FIG. 2, an active portion 212 of the slider bar 214 includes two UI elements 202 and 204.

In some embodiments, the method 400 includes determining (408) a relative position of the first UI element to the second UI element on the slider bar. Once a user finishes relocating UI elements on a slider bar, for example, the relative locations of the UI elements may be determined to infer user-assigned priorities to the entities (or data sets) represented by these UI elements. Note that, here, the user does not have to take additional actions (to relocate the UI elements) to prioritize the entities represented by the UI elements. Once UI elements are assigned their respective positions on a slider bar, entity priorities can be automatically determined or inferred without requiring additional user input.

In some embodiments, the method 400 includes assigning (410), based on the relative position, automatically without user input, transaction priorities to a first entity identified by the first UI element and to a second entity identified by the second UI element.

To continue with the example shown in FIG. 3, the relative positions of the UI element "age" 302 and the UI element "foo" 304 are determined for data visualization or prioritization purpose. Because the "age" element 302 is located to the left of the "foo" element 304, the "age" data set may be considered a lower priority data set; and the "foo" data set may be considered a higher priority data set.

Note that, here, a data set's priority is inferred or determined without explicit user input. In other words, a user is not required to expressly assign a "high" priority to the "foo" data set and a "low" priority to the "age" data set. Rather, a user can indicate that the "foo" data set should be given a "high" or higher relative priority and the "age" data set should be given a "low" or lower relative priority by positioning, on the slider bar 306, the element "age" 302 to the left of the element "foo" 304.

UI elements located outside an active portion of a slider bar are, in some embodiments, considered unselected or excluded e.g., for data visualization or periodization purpose. As a result, no priority is assigned to them.

In some embodiments, therefore, the method 400 also includes detecting that the first UI element is located outside the active portion of the slider bar; and responsive to the detecting, determining that no transaction priority exists between the first entity and the second entity.

For example, as shown in FIG. 3, the UI element "bar" 318 is not located within the active portion 318 of the slider bar 306; as a result, the "bar" data set is considered not selected for the purpose of visualization in the pie chart 310. A shown in FIG. 3, the pie chart 310 includes only the "age" data set and the "foo" data set, but not the "bar" data set. Also, because the "bar" data set is not selected, no priority is assigned to it.

Data priorities (as impliedly indicated by their relative positions on a slider bar) can be used to conduct further transactions. In some embodiments, therefore, the method 400 also includes causing a transaction involving the first entity and the second entity to be executed based on the transaction priorities.

For example, UI elements presented on a slider bar may represent payees, search terms, online orders, and any other entities or objects on which a common action may be taken—in a particular order.

In a further example, the UI elements 302 and 304 may represent payees A and B; moving the UI elements 302 and 304 on the slider bar 306 may change the payment priorities of the payees A and B.

For example, when neither of the elements 302 and 304 is within the active portion 316, neither payee A nor payee B will receive a payment; when the element 302 is within the active portion 316, but the element 304 is not, payee A will receive a payment, but payee B will not; when the element 304 is within the active portion 316, but the element 302 is not, payee B will receive a payment, but payee A will not.

When both the elements 302 and 304 are within the active portion 316 of the slider bar 306, both payees A and B will receive a payment. Note that in this case, the priorities of receiving payments may be determined based on the elements 302 and 304's locations on the slider bar 316. For example, when the element 304 is located to the right of the element 302 on the slider bar 305, as shown in FIG. 3, a payment is made to payee B (which is represented by the element 304) before a payment is made to payee A (which is represented by the element 302). When the element 304 is located to the left of the element 302 on the slider bar 305, a payment is made to payee A (which is represented by the element 302) before a payment is made to payee B (which is represented by the element 304).

When the elements 302 and 304 are located at a substantially same location on the slider bar 306, payments to payees A and B are made at the same time.

In other implementations, the elements 302 and 304 may represent search terms, and placing the elements 302 and 304 in the active portion 306 may cause searches with the corresponding search terms to be executed—with result matching priorities given to different search terms based on their locations.

For example, the UI elements 302 and 304 may represent search terms "laptop" and "China," respectively; placing both the elements 302 and 304 in the active portion 316 of the slider bar 306 may cause a search query including both the terms "laptop" and "China" (e.g., "laptops made in the China regions") to be executed.

Note that because the UI element 304 (which corresponds to the keyword "China") is located to the right of the UI element 302 (which corresponds to the keyword "laptop"), the search query is executed with a stronger search focus on the term "China" than on the term "laptop," i.e., the term "China" is weighted more heavily than the term "laptop." As a result, for example, search results involving the term "China," but not literally the term "laptop," e.g., ("laptops made in Asia)" may still be considered matching or relevant to the search query ("laptops made in the China regions").

A slider bar has an express directionality, in some implementations. In some implementations, therefore, the slider bar is a directional slider bar; and the method 400 further includes: assigning the transaction priorities to the first entity and to the second entity based on directionality of the slider bar.

For example, the slider bar 306 may have a left-to-right direction, which may dictate that UI elements placed at positions that are closer to the right end of the slider bar are assigned higher priorities higher than those placed at positions that are closer to the left end of the slider bar.

In other words, the directionality of a slider bar is used to determine or infer which UI elements should receive higher priorities. These technologies are technically advantageous, as a user does not have to provide separate user inputs for specifying (1) which UI elements are selected, and (2) what the priorities assigned to the selected UI elements are.

A user device equipped with a limited display real estate or a limited user input means may automatically present a slider bar to a user, upon detecting that the user is about to execute a data processing application (e.g., a data visualization application).

In some embodiments, therefore, the method 400 also includes determining that a user input area of a user device on which the first UI element is displayed is below a predetermined size and presenting the slider bar on the user device, responsive to the determining.

For example, when a software application (e.g., a data visualization application) running on a mobile device requests a user to provide a number of inputs to identify (1) which data sets, among a larger number of (e.g., 20) candidate data sets, need to be selected and (2) what priorities should be assigned to the selected data sets, the application may first determine whether the mobile device has an appropriate user input means, e.g., a 10" (width) by 20" (height) touchscreen, the candidate data sets.

When the user input means is considered as limited, e.g., when the mobile device is a smartphone that has only a 2" (width) by 6" (height) touchscreen, the application may automatically present a slider bar implemented with technologies described in the present disclosure, so that the user can accomplish the data processing tasks required more efficiently.

A slider bar's active portion may include multiple, e.g., three or more, UI elements. In some embodiments, therefore, the method 400 also includes detecting a third movement of a third UI element on the slider bar; determining that the third UI element is relocated within the active portion of the slider bar; determining a third relative position of the third UI element to the second UI element; and assigning third transaction priorities to a third entity identified by the third UI element and to the first entity.

For example, a slider bar's active portion may include three UI elements, each representing a different data set. The priorities assigned to these data sets may be determined based on the locations of the UI elements on the slider bar. For example, if the active portion 316 includes the UI elements 302, 304, and 306, each representing a different payee; the priorities of making payments to these payees may be determined based on where the UI elements 302, 304, and 306 are located within the slider bar 316.

A slider bar may include multiple active portions that are immediately adjacent to each other. In some embodiments, for example, the active portion of the slider bar includes two or more sub-portions that are not continuous.

For example, as shown in FIG. 3, the slider bar may include an active portion other than the portion 316. The other active portion (e.g., the portion between the UI element "line" and the UI element "bar") may not be immediately adjacent to the portion 316. These technologies are technically advantageous, as a user is not required to move UI elements to a particular direction or location to indicate selections of the corresponding data sets, especially when a UI element is located over a predefined distance away from a particular active portion.

Also when there are multiple active portions, data priorities may be assigned based a tiered structure. For example, UI elements located within one active portion may be identified as having higher priorities than those located within another active portion; and priorities assigned to UI elements within a same active portion may be determined in accordance with technologies described with reference to FIGS. 2-3.

In some implementation, user input provided using a slider bar is automatically populated to another data representation, where the selected data are visualized.

The method 400 may therefore also include responsive to determining that the first UI element is within the active portion of the slider bar, presenting first data set associated with the first entity in a graphical representation other than the slider bar. In some embodiments, the graphical presentation includes a bar chart, a pie chart, a line chart, or a histogram.

For example, as shown in FIG. 3, the data sets "age" and "foo," after being selected by a user using the slider bar 306, are displayed in the pie chart 310. These technologies are advantageous, as a user can review data visualization results concurrently with her positioning of the corresponding UI elements on a slider bar.

An active portion of a slider bar can adjust its own size automatically. For example, the active portion 316 of the slider bar 306 may enlarge itself automatically, as more UI elements are relocated inside, so that the locations (and corresponding priorities) of the UI elements within the active portion can be better visualized for a user. As another example, the active portion 316 of the slider bar 306 may reduce itself automatically, as more UI elements are relocated outside, so that a user may have better visual cues as to which elements are selected and which elements are not selected.

FIG. 5 is a schematic view illustrating an embodiment of a computing system 500, which can be the server system 106 shown in FIG. 1. The system 500 in some implementations includes one or more processing units CPU(s) 502 (also referred to as hardware processors), one or more network interfaces 504, a memory 506, and one or more communication buses 508 for interconnecting these components. The communication buses 508 optionally include circuitry (sometimes called a chipset) that interconnects and controls communications between system components. The memory 506 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 506 optionally includes one or more storage devices remotely located from the CPU(s) 502. The memory 506, or alternatively the non-volatile memory device(s) within the memory 506, comprises a non-transitory computer readable storage medium. In some implementations, the memory 506 or alternatively the non-transitory computer readable storage medium stores the following programs, modules and data structures, or a subset thereof:

- an operating system 510, which includes procedures for handling various basic system services and for performing hardware dependent tasks;
- a network communication module (or instructions) 512 for connecting the system 500 with other devices (e.g., a user device 102) via one or more network interfaces 704;
- a data processing module 122 for processing data in accordance with user input provided on UI controls (e.g., a slider bar) displayed on a user device 102;
- a transaction module 128 for executing transactions (e.g., making a payment, executing a search, or sorting a spreadsheet) based on user input provided on a user device 102; and
- data 514 stored on the system 700, which may include:
  - user-selected data sets 516 (as identified by the UI elements located within an active portion of a slider bar); and
  - data priorities 518 (as implied by the relative positions of the UI elements).

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 606 optionally stores a subset of the modules and data structures identified above. Furthermore, the memory 606 may store additional modules and data structures not described above.

Figure 6:
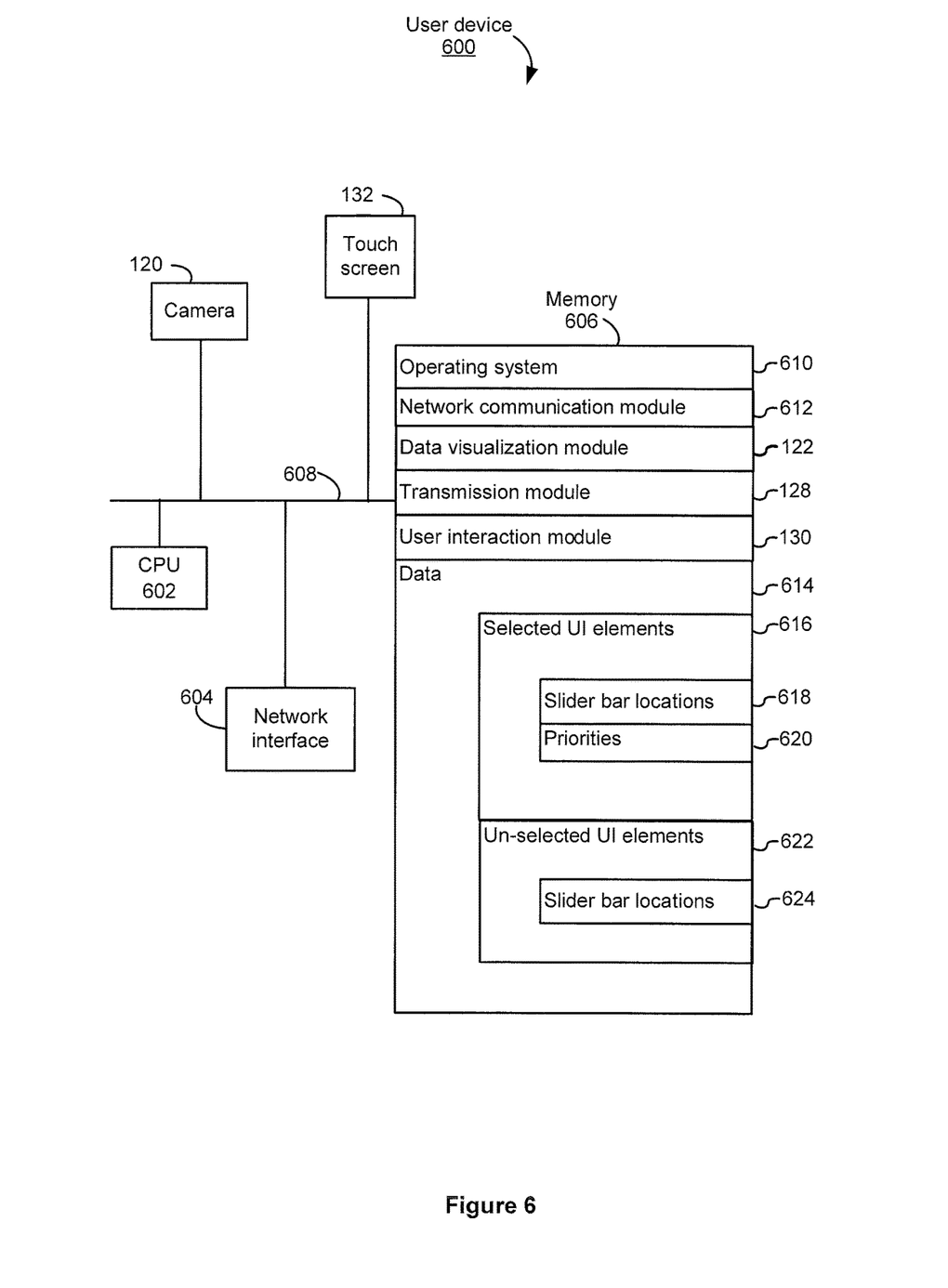
FIG. 6 is a schematic view illustrating an embodiment of a user device.

FIG. 6 is a schematic view illustrating an embodiment of a user device, which can be the device 102 shown in FIG. 1. The device 600 in some implementations includes one or more processing units CPU(s) 602 (also referred to as hardware processors), one or more network interfaces 604, a memory 606, and one or more communication buses 606 for interconnecting these components. The communication buses 606 optionally include circuitry (sometimes called a chipset) that interconnects and controls communications between system components. The memory 606 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 606 optionally includes one or more storage devices remotely located from the CPU(s) 602. The memory 606, or alternatively the non-volatile memory device(s) within the memory 606, comprises a non-transitory computer readable storage medium. In some implementations, the memory 606 or alternatively the non-transitory computer readable storage medium stores the following programs, modules and data structures, or a subset thereof:

- an operating system 610, which includes procedures for handling various basic system services and for performing hardware dependent tasks;
- a network communication module (or instructions) 612 for connecting the device 600 with other devices (e.g. another user device 102 or a server system 106) via one or more network interfaces 804 (wired or wireless) or via the communication network 104 (FIG. 1);
- a data visualization module 122 for visualizing user-selected data sets in accordance with priorities assigned to these data sets;
- a transmission module 128 for transmitting data between a user device and a server system in accordance with user requirements;
- a user interaction module 130 for identifying user inputs to a UI control (e.g., a slider bar);
- data 614 stored on the device 600, which may include:
  - information identifying user-selected UI elements 616 on a slider bar, which may include:
    - the selected UI elements corresponding slider bar locations 618; and
    - their respective data processing priorities 6120 as identified by the slider bar locations 618; and
  - information identifying un-selected UI elements 622 on the slider bar, for example, an un-selected UI element's corresponding slider bar location 624.

The device 600 may also include a camera 120 for capturing user finger or body movements, and a touch screen 132 for detecting user gestures and presenting information to a user.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 608 optionally stores a subset of the modules and data structures identified above. Furthermore, the memory 606 may store additional modules and data structures not described above.

Although FIGS. 5 and 6 show a "computing system 500" and a "device 600," respectively, FIGS. 5 and 6 are intended more as functional description of the various features which may be present in computer systems than as a structural schematic of the implementations described herein. In practice, and as recognized by those of ordinary skill in the art, items shown separately could be combined and some items could be separated.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and users; however, a user or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
   determining, by one or more hardware processors, a set of entities associated with a set of pending transactions;
   generating, by one or more hardware processors, a slider bar object for manipulating attributes of the set of entities, wherein the slider bar object comprises a slider bar and a set of user interface (UI) elements representing the set of entities, wherein the slider bar comprises an active portion and an inactive portion;
   displaying, by the one or more hardware processors, the slider bar and the set of UI elements on a user device, wherein the active portion of the slider bar is displayed with a different visual appearance than the inactive portion of the slider bar;
   receiving, by the one or more hardware processors, a first user input indicating a first movement of a first UI element from the set of UI elements on the slider bar;
   determining, by the one or more hardware processors, that a first subset of UI elements from the set of UI elements is located within the active portion of the slider bar;
   determining, by the one or more hardware processors, that a second subset of UI elements from the set of UI elements is located within the inactive portion of the slider bar;
   automatically assigning, by the one or more hardware processors without requiring any additional user input, transaction priorities to a first subset of entities from the set of entities represented by the first subset of UI elements based on relative positions of the first subset of UI elements with respect to each other within the active portion of the slider bar; and
   performing, by the one or more hardware processors, transactions for the first subset of entities according to the assigned transaction priorities, wherein no transactions are performed for a second subset of entities based on the second subset of UI elements being located in the inactive portion of the slider bar.

2. The method of claim 1, wherein the slider bar is a directional slider bar, and wherein the transaction priorities are assigned to the first subset of entities further based on a directionality of the slider bar.

3. The method of claim 1, further comprising:
   determining a size of a user input area of the user device; and
   adjusting a size of the slider bar based on the determined size of the user input area.

4. The method of claim 1, further comprising:
   receiving a second user input on the user device indicating a second movement of a second UI element on the slider bar;
   determining that the second UI element is relocated to a position within the active portion of the slider bar; and
   automatically re-assigning the transaction priorities to the first subset of entities comprising a second entity represented by the second UI element based at least in part on the relocated position of the second UI element.

5. The method of claim 1, wherein the active portion of the slider bar includes two or more sub-portions that are not continuous.

6. The method of claim 1, further comprising:
   in response to determining that the first subset of UI elements is within the active portion of the slider bar, presenting a graphical representation other than the slider bar indicating the transaction priorities assigned to the first subset of entities.

7. The method of claim 6, wherein the graphical representation includes at least one of a bar chart, a pie chart, a line chart, or a histogram.

8. The method of claim 1, further comprising resizing the active portion of the slider bar in response to a second user input.

9. A non-transitory machine-readable medium having stored thereon machine-readable instructions executable to cause a machine to perform operations comprising:
   determining a set of entities associated with a set of pending transactions;
   generating a slider bar object for manipulating attributes of the set of entities, wherein the slider bar object comprises a slider bar and a set of user interface (UI) elements representing the set of entities, wherein the slider bar comprises an active portion and an inactive portion;
   displaying the slider bar and the set of UI elements on a user device, wherein the active portion of the slider bar is displayed with a different visual appearance than the inactive portion of the slider bar;
   receiving a first user input indicating a first movement of a first UI element from the set of UI elements on the slider bar;
   determining that a first subset of UI elements from the set of UI elements is located within the active portion of the slider bar;
   determining, by the one or more hardware processors, that a second subset of UI elements from the set of UI elements is located within the inactive portion of the slider bar;
   automatically assigning, without requiring any additional user input, transaction priorities to a first subset of entities from the set of entities represented by the first subset of UI elements based on relative positions of the first subset of UI elements with respect to each other within the active portion of the slider bar; and
   performing transactions for the first subset of entities according to the assigned transaction priorities, wherein no transactions are performed for a second subset of entities based on the second subset of UI elements being located in the inactive portion of the slider bar.

10. The non-transitory machine-readable medium of claim 9, wherein the operations further comprise:
    determining that the first UI element is located in the inactive portion of the slider bar; and
    in response to determining that the first UI element is located in the inactive portion of the slider bar, determining that no transaction is performed for a first entity represented by the first UI element.

11. The non-transitory machine-readable medium of claim 9, wherein the slider bar is a directional slider bar, and wherein the transaction priorities are assigned to the first subset of entities further based on a directionality of the slider bar.

12. The non-transitory machine-readable medium of claim 9, wherein the operations further comprise:
   determining an orientation of a user input area of the user device; and
   adjusting an orientation of the slider bar on the user device based on the determined orientation of the user input area.

13. The non-transitory machine-readable medium of claim 9, wherein the operations further comprise:
   receiving a second user input on the user device indicating a second movement of a second UI element on the slider bar;
   determining that the second UI element is relocated to a position within the active portion of the slider bar; and
   automatically re-assigning the transaction priorities to the first subset of entities comprising a second entity represented by the second UI element based at least in part on the relocated position of the second UI element.

14. The non-transitory machine-readable medium of claim 9, wherein the operations further comprise:
   in response to determining that the first subset of UI elements is located within the active portion of the slider bar, presenting a graphical representation other than the slider bar indicating the transaction priorities assigned to the first subset of entities.

15. The non-transitory machine-readable medium of claim 14, wherein the graphical representation includes at least one of a bar chart, a pie chart, a line chart, or a histogram.

16. The non-transitory machine-readable medium of claim 9, wherein the operations further comprise resizing the active portion of the slider bar in response to a second user input.

17. A system comprising:
   a non-transitory memory; and
   one or more hardware processors coupled with the non-transitory memory and configured to read instructions from the non-transitory memory to cause the system to perform operations comprising:
      determining a set of entities associated with a set of pending transactions;
      generating a slider bar object for manipulating attributes of the set of entities, wherein the slider bar object comprises a slider bar and a set of user interface (UI) elements representing the set of entities, wherein the slider bar comprises an active portion and an inactive portion;
      displaying the slider bar and the set of UI elements on a user device, wherein the active portion of the slider bar is displayed with a different visual appearance than the inactive portion of the slider bar;
      receiving a first user input indicating a first movement of a first UI element from the set of UI elements on the slider bar;
      determining that a first subset of UI elements from the set of UI elements is located within the active portion of the slider bar;
      determining that a second subset of UI elements from the set of UI elements is located within the inactive portion of the slider bar;
      automatically assigning, without requiring any additional user input, transaction priorities to a first subset of entities from the set of entities represented by the first subset of UI elements based on relative positions of the first subset of UI elements with respect to each other within the active portion of the slider bar; and
      performing transactions for the first subset of entities according to the assigned transaction priorities, wherein no transactions are performed for a second subset of entities based on the second subset of UI elements being located in the inactive portion of the slider bar.

18. The system of claim 17, wherein the slider bar is a directional slider bar, and wherein the transaction priorities are assigned to the first subset of entities further based on a directionality of the slider bar.

19. The system of claim 17, wherein the operations further comprise:
   receiving a second user input on the user device indicating a second movement of a second UI element on the slider bar;
   determining that the second UI element is relocated to a position within the active portion of the slider bar; and
   automatically re-assigning the transaction priorities to the first subset of entities comprising a second entity represented by the second UI element based at least in part on the relocated position of the second UI element.

20. The system of claim 17, wherein the operations further comprise in response to determining that the first subset of UI elements is within the active portion of the slider bar, presenting a graphical representation other than the slider bar indicating the transaction priorities assigned to the first subset of entities.

* * * * *